3,388,074
TWO-STAGE STEAM REFORMING WITH RAPID
WARM-UP IN FIRST STAGE BY MEANS OF A
PROMOTED CATALYST
Ronald E. Reitmeier, Middletown, Ky., assignor to Catalysts and Chemicals, Inc., a corporation of Delaware
No Drawing. Filed Dec. 26, 1963, Ser. No. 333,718
4 Claims. (Cl. 252—373)

ABSTRACT OF THE DISCLOSURE

A steam-gas hydrocarbon reforming catalyst promoted with platinum or palladium supplies heat to the system concomitantly with reforming in a first stage of reforming process to which oxygen is added, combustion occurring in said stage ahead of subsequent reforming.

---

This invention, in one of its aspects, pertains to improvements in the production of hydrogen from hydrocarbons. In another aspect the invention relates to improvements in hydrocarbon gas reforming. In still another aspect the invention is concerned with improvements in the production of ammonia.

Hydrogen, particularly for use in the synthesis of ammonia, destructive hydrogenation of oils and for similar commercial hydrogenation processes, can be economically and advantageously prepared by contacting natural gas or other gases which contain appreciable quantities of hydrocarbons, for example, methane, ethane, propane, and the like, with steam. In effecting this reaction of steam with a hydrocarbon the following reactions occur, using methane as the gas.

$$CH_4 + H_2O \rightleftharpoons CO + 3H_2$$
$$CH_4 + 2H_2O \rightleftharpoons CO_2 + 4H_2$$

The production of hydrogen from steam and gaseous hydrocarbons according to the foregoing reactions is markedly endothermic. Hence, to establish an equilibrium corresponding to the desired composition of gaseous products, it is desirable to use high temperatures, for example from 1100° F. to as high as 2500° F. Conversion temperatures of 1100° F. to 2000° F. are generally employed in reforming furnaces. The higher temperatures, up to 2500° F., are obtained in adiabatic units. Reforming furnaces usually are multi-tube reactors. Such furnaces are equipped with vertical catalyst-filled tubes which are twenty to forty feet long, having diameters of two to ten inches. Adiabatic reformers are unfired single-bed reactors which can be used alone, or following a reforming furnace, as a secondary reformer. Heat is supplied by a combustion reaction in the top of the adiabatic reactor, oxygen being injected. The catalyst employed in the tubes of a reforming furnace or in an adiabatic reformer normally consists of a metal of the iron group of the Periodic Table, such as nickel, deposited on a temperature resistant support.

In carrying out an endothermic reaction in a tubular reactor, it is necessary to have a supply of heat such that a temperature gradient can be maintained. Therefore, parallel flow between the feed gas, or process gas, in the tubes within and the hot combustion gas without, is ordinarily employed. Accordingly the furnace combustion gas or fuel oil is burned or fired at the entrance of the furnace. In order that the process gas leave the apparatus, that is reach the outlet of the furnace, at a high temperature, say 1800° F. a much higher combustion gas temperature, up to 3500° F. must be maintained at the head of the furnace. Thermal efficiency is still very low at desired space velocities of 400 to 4,000 volumes of gas under standard conditions of temperature and pressure per unit volume of catalyst per hour. As a result reforming does not take place over the entire length of the furnace tubes.

Due to low thermal efficiency in gas reforming, it is desirable to supply additional heat to the endothermic reaction so that either fuel consumption can be cut for a given throughput rate, or so that the throughput rate can be increased at the same level of fuel consumption. One method is to add air or oxygen to the hydrocarbon feed gas in the upper section of the tubes. As in an adiabatic reformer the oxygen or air is injected so that some hydrocarbon in the feed stream will be burned. This reaction is exothermic and may be written $$CH_4 + 2O_2 \rightleftharpoons CO_2 + 2H_2O$$

Carrying out the reaction within the tubes allows the fired tubes to be smaller than would be the case if no oxygen or air were used. The injection of air into a reformer reaction zone is a particularly convenient method for adding nitrogen to the system for the production of ammonia synthesis gas, in addition to heat considerations.

In accordance with this invention catalysts are provided which permit temperature conditions to be rapidly attained in reforming processes where air or oxygen is employed, so that some hydrogen, carbon monoxide or hydrocarbon will be burned.

An object of this invention is to eliminate a long residence time below reforming temperatures, thereby allowing reforming to take place over more of the furnace tube length.

Another object of the invention is to reduce fuel consumption in the reforming of a hydrocarbon stream while also reducing the quantity of that hydrocarbon in the reformed gas.

Still another object of the invention is to provide a novel catalyst for use in top sections of reforming furnace tubes and in adiabatic reformers.

Reforming catalysts are generally oxides of metals having atomic weights between 52 and 59, carried on a refractory support. Especially good reforming catalysts are nickel and chromium oxides on the refractory support. However iron, cobalt and manganese oxides are also employed. Reforming catalysts contain at least 15 percent active metal, and may contain as much as 40 percent. Various refractory supports have been used, for instance such siliceous materials as the calcium and aluminum silicates and silica-alumina gels. Clays such as kaolin have also been used. However the most frequently used refractory supports at present, and those to which this invention has particular application, are difficultly reducible metal oxides and the aluminates such as alumina, magnesia, calcium oxide and calcium aluminate, etc.

According to the practice of this invention a process is provided for the conversion of a hydrocarbon to a gas comprising hydrogen and carbon monoxide in which the vaporized hydrocarbon is reacted with oxygen in addition to steam to supply heat to the endothermic reforming reaction. It has been found that a rapid elevation of the temperature to reforming requirement can be brought about, thereby eliminating a long residence time at temperatures below which reforming takes place, by introducing the mixture of the hydrocarbon, steam and oxygen into a reaction zone into contact with a reforming catalyst containing an oxide of a metal having an atomic weight between 52 and 59, supported on a refractory base, and promoted by the deposition of 0.05 to 0.25 weight percent platinum or palladium on the surface thereof, preferably 0.1 to 0.25 weight percent based on the total weight of the catalyst.

In making the catalysts of this invention a soluble platinum salt can be mixed with the catalyst salts during its preparation. It is preferred to apply the salt to a conventional reforming catalyst by spraying or dipping the catalyst in a solution of the soluble platinum salt. After the platinum compound is thus applied the salt is converted to the metal or its oxide, either during the drying or subsequent to drying as a preliminary step in reforming. During use however it is converted to platinum metal. Any of the soluble platinum salts can be employed, especially the chlorides and nitrates, for example PtCl₄, chloroplatinic acid, or amine salts of chloroplatinic acid. Normally a solution containing 0.25 to 1 weight percent of the platinum salt based on platinum is applied to the reforming catalyst. The concentration of the solution within said range depends on whether the catalyst is sprayed or dipped. If the catalyst is dipped, a 0.25 to 0.5 percent solution is used. If the platinum solution is sprayed, the 1 per cent solution is employed, less of the solution being required for spraying. The solution is applied so that the prepared catalyst contains 0.05 to 0.25 weight per cent platinum (as metal) based on the weight of the catalyst. In addition palladium can be used in lieu of platinum, larger amounts of the palladium salts, within said range, being employed.

The hydrocarbons to which this invention applies are those normally gaseous hydrocarbons conventionally subjected to reforming, for instance methane, ethane, propane and butane, etc. as well as gases which contain these hydrocarbons, for example cracking gases, low temperature carbonation gases and waste gases from destructive hydrogenation of coals, tars, oils and the like. However, because of the nature of the invention liquid hydrocarbons, boiling up to 350° F., can be used, for example, naphtha and pentane, heptane, decane, etc. Preferred hydrocarbons are first desulfurized by one of the known absorption, adsorption, or catalytic methods since catalyst life is thereby prolonged.

Having set forth the general nature of the invention, the various embodiments will best be understood from a detailed description and specific examples. The work was carried out in an ammonia plant. The reformer employed in the examples was a commercial multi-tubular low pressure side fired gas reforming furnace consisting of four cells for four catalyst tubes each, separated by fire walls. Each tube is 28.5 feet long, the box-type fired zone surrounding the lower 25 feet of the tubes, with burners along the side of the fire box for supplying heat to the reaction by indirect heat exchange.

In one embodiment this invention is concerned with the time that it takes a feed gas stream of hydrocarbon, steam, and air to reach reforming temperature. This time period can be shown by temperatures taken at various depths in the tubes of the reforming furnace. The following example best illustrates this aspect of the invention. The reforming catalyst employed in this and the other examples was a commercial nickel catalyst consisting of 33 weight percent nickel oxide on a refractory support consisting of approximately equal proportions of magnesium oxide, aluminum oxide, calcium aluminate and calcium silicate in the form of ½ by ½ inch cylinders. In the preparation of the platinum catalyst of the invention, each 100 parts by weight of this nickel catalyst were sprayed with 8.75 parts by weight of water containing, in solution, 0.1 part by weight of chloroplatinic acid.

EXAMPLE 1

Two cells of four tubes each of the described reformer were provided with recording means so that temperatures could be taken at one foot levels throughout the upper ten foot sections. The cells were filled to this point with the commercial nickel catalyst. The upper ten feet of one cell (Cell #1) were charged with the same catalyst having the platinum deposited thereon according to this invention. The upper ten feet of the four tubes of Cell #3 were charged with the nickel catalyst without platinum used in the lower portion of all of the tubes. After bringing the furnace to heat by a conventional startup procedure, the hydrocarbon, steam and air were admitted to the furnace at the rate of 1,000 cu. ft. per hour, passing through three and one-half feet of tube above the fire box. Temperatures were taken at various depths in each cell of the furnace as the feed gas was being heated up. Each cell had two top main fuel burners off and the top three purge burners off. The temperatures recorded are shown in Table 1.

TABLE 1.—TEMPERATURE IN CATALYST REFORMING FURNACE

| Depth, ft. | Cell #1 (Four tubes, ° F.) | | | | Cell #3 | | | |
|---|---|---|---|---|---|---|---|---|
| 5 | 475 | 465 | 465 | 470 | 462 | 462 | 455 | 460 |
| 6 | 550 | 515 | 535 | 540 | 510 | 510 | 500 | 505 |
| 7 | 625 | 585 | 610 | 600 | 560 | 570 | 560 | 555 |
| 8 | 785 | 750 | 1,025 | 665 | 620 | 630 | 620 | 610 |
| 9 | 1,395 | 1,335 | 1,380 | 727 | 665 | 675 | 665 | 665 |
| 10 | 1,240 | 1,265 | 1,240 | 1,165 | 727 | 725 | 725 | 715 |

It can be seen that in the four tubes of Cell #1 which contain the platinum catalyst of this invention, reaction temperatures are attained much more rapidly than with a conventional catalyst as contained in the four tubes of Cell #3. In fact, in three of the reforming tubes of Cell #1 reforming began, whereas in Cell #3 temperatures had not even reached 800° F. This can be seen by the temperature drop from the nine to ten foot levels.

One of the advantages of this invention is that operation according to its teachings affords a means of reducing fuel consumption for a given quantity of produced gas. This is illustrated by the following.

EXAMPLE 2

Two furnaces were operated under equal conditions of temperature, space velocity and steam-hydrocarbon-oxygen ratios. Furnace A was charged with the nickel catalyst throughout, whereas Furnace B contained the catalyst of the invention in the ten feet of each tube. Fuel consumption for one ton of ammonia was as follows:

|  | M.c.f./t. |
|---|---|
| Furnace A | 9,668 |
| Furnace B | 8,975 |

Fuel consumption in Furnace B, containing the catalyst of this invention, at a throughput of 1,000 cu. ft. per ton is 693 million cu. ft. per ton of ammonia less than with the reformer which did not contain the catalyst of the invention.

In addition to the fact that fuel consumption is less in the production of ammonia, the quantity of ammonia produced can be increased for the same period of time by use of the catalyst of this invention.

EXAMPLE 3

The production of ammonia from gases from Furnace A and Furnace B operated as described in Example 2 is as follows:

|  | T./d. |
|---|---|
| Furnace A | 31.56 |
| Furnace B | 33.16 |

Production of ammonia based on Furnace B containing the catalyst of this invention is 1.6 tons per day higher than ammonia production based on reforming Furnace A.

Not only does operation with the catalyst of this invention lead to greater amonmia production and less fuel consumption, but long residence time at temperatures below reforming temperatures is eliminated, resulting in increased production of hydrogen.

EXAMPLE 4

To the reforming furnace containing the kickoff catalyst of this invention in the upper ten foot sections of the furnace tubes the following gas mixture was charged: feed gas 59,042 s.c.f.h.; steam 157,500 s.c.f.h.; and air 61,376 s.c.f.h. (standard cubic feet per hour). The air contained 10.7 percent oxygen. The composition of the gas stream before and after reforming was as follows:

Composition of feed gas

| | Percent |
|---|---|
| $CO_2$ | 0.3 |
| $N_2$ | 0.4 |
| $CH_4$ | 95.9 |
| $C_2H_6$ | 2.3 |
| $C_3H_8$ | 0.6 |
| $C_4H_{10}$ | 0.3 |
| $C_5H_{12}$ | 0.2 |

Composition of exit gas

| | Percent |
|---|---|
| CO | 13. |
| $CO_2$ | 11. |
| $CH_4$ | 0.1 to 0.3. |
| $N_2$ | 10 to 20. |
| H | 100, less above percentages. |

Referring to this data, it is seen that following the teachings of this invention the hydrocarbons in the feed gas have been reduced by conversion to only 0.1% to 0.3% from 99.3%. It is therefore particularly important to raise the temperature rapidly to reforming temperature requirements and thereby reduce residence time below reforming temperatures.

EXAMPLE 5

Into the bottom of an upflow unfired single bed reactor were placed 13 cu. ft. of the platinum catalyst described and used in the preceding examples. To the reactor were then added 208 cu. ft. of the nickel catalyst without platinum (nickel on a calcium aluminate-alumina refractory—total catalyst 221 cu. ft.). Into the bottom of the adiabatic reformer, a naphtha (boiling range 110° F. to 221° F.—sulfur 50 p.p.m.) and steam gas stream preheated to 480° F. was introduced. The composition of this naphtha feed gas stream, expressed in a ratio per mol of naphtha was:

Feed gas stream (mol ratio)

| | |
|---|---|
| Naphtha | 1 |
| Steam | 4.8 |
| Enriched air (2.9 mols $O_2$ per 4.2 mols $N_2$) | 7.2 |
| Recycle gas (containing 23% $CO_2$; 3% CO; 55% $H_2$; and 0.3% $CH_4$) | 0.6 |

On contacting the catalyst of this invention, naphtha and other components in the feed stream, preheated to 480° F., react with oxygen, raising the temperature to 1730° F. by the time the gas stream reaches the unpromoted nickel reforming catalyst. The space velocity was 945. The endothermic reforming reaction then taking place lowers the temperature to 1460° F., the temperature at the reactor outlet being 1450° F. The composition of the exit gas stream was:

Exit gas stream composition

| | Percent |
|---|---|
| $H_2$ | 45.9 |
| CO | 22.2 |
| $N_2$ | 22.3 |
| $CO_2$ | 8.9 |
| $CH_4$ | 0.3 |
| Ar | 0.4 |

Since the catalyst of this invention in the gas entrance sections of reforming furnaces effects rapid initial temperature elevations, it is called a kickoff catalyst. This kickoff catalyst is used either in the top or bottom of the reformer depending on whether flow of reaction gases is up or down. Since reforming temperatures are reached much more rapidly, reforming of liquid hydrocarbons can be conveniently accomplished. In addition, it is understood that the reforming catalyst need not be the same as the kickoff catalyst except for the platinum promoter. One reforming catalyst can be impregnated with platinum, and another can be used in the remainder of the reformer. Other variations and modifications will occur to those skilled in the art. Such ramifications are deemed to be within the scope of this invention.

I claim:

1. In the process for reforming desulfurized hydrocarbons having boiling points up to 350° F. in which the hydrocarbon is reacted with steam at a reforming temperature in the range of 1100° F. to 2500° F. and in which heat is provided by indirect heat exchange the improvement for supplying additional heat to preheated inlet gases so that the reforming reaction temperature is reached more rapidly due to the supplied heat which comprises introducing oxygen into the preheated feed stream in addition to the hydrocarbon and steam, and passing the mixture over a reforming catalyst comprising 15 to 40 percent of a metal having an atomic weight between 52 and 59, supported on a refractory base, and promoted by 0.05 to 0.25 weight percent of a metal selected from the group consisting of platinum and palladium, the percentages being on the total catalyst, bringing the temperature rapidly to 1100° F. by combustion in a first stage of reforming effected over the promoted catalyst, concomitantly reforming a portion of the hydrocarbon in said stage over the catalyst, and then reforming the remaining portion of the hydrocarbon stream in a second stage over an unpromoted reforming catalyst comprising 15 to 40 percent of a metal having an atomic weight between 52 and 59 supported on a refractory base.

2. The process of claim 1 wherein the first stage catalyst is nickel reforming catalyst promoted with platinum and wherein the second stage catalyst is an unpromoted nickel reforming catalyst.

3. The process of claim 1 wherein the feed stream is methane.

4. The process of claim 1 wherein the feed stream is naphtha.

References Cited

UNITED STATES PATENTS

| 2,142,678 | 1/1939 | Porter | 23—288 X |
| 2,803,295 | 8/1957 | Ambrose et al. | 252—460 X |
| 2,868,632 | 1/1959 | Milbourne | 48—215 X |
| 3,031,286 | 4/1962 | Bartholome et al. | 48—196 |
| 3,271,325 | 9/1966 | Davies et al. | 48—214 X |
| 3,334,055 | 8/1967 | Dowden et al. | 48—214 X |

FOREIGN PATENTS 834,595  5/1960  Great Britain.

JOSEPH SCOVRONEK, *Primary Examiner.*